(12) United States Patent  (10) Patent No.: US 7,388,888 B2
Lee et al.  (45) Date of Patent: Jun. 17, 2008

(54) METHOD FOR TRANSMITTING AND RECEIVING ETHERNET DATA IN SYSTEM BASED ON BROADCAST/COMMUNICATION CONVERGENCE

(75) Inventors: Seung-Jin Lee, Seoul (KR); Jae-Hun Cho, Suwon-si (KR); Yun-Je Oh, Yongin-si (KR); Jun-Ho Koh, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 749 days.

(21) Appl. No.: 10/861,058

(22) Filed: Jun. 4, 2004

(65) Prior Publication Data

US 2005/0169302 A1  Aug. 4, 2005

(30) Foreign Application Priority Data

Jan. 30, 2004  (KR)  ............... 10-2004-0006150

(51) Int. Cl.
*H04J 3/04* (2006.01)
(52) U.S. Cl. ............................................. 370/535
(58) Field of Classification Search ............... None
See application file for complete search history.

(56) References Cited

U.S. PATENT DOCUMENTS

| 6,608,834 | B1* | 8/2003 | Lewin et al. | 370/395.53 |
|---|---|---|---|---|
| 6,967,949 | B2* | 11/2005 | Davis et al. | 370/390 |
| 2002/0199021 | A1* | 12/2002 | Beier | 370/409 |
| 2003/0058888 | A1* | 3/2003 | Shinoda | 370/470 |
| 2003/0091045 | A1* | 5/2003 | Choi et al. | 370/390 |
| 2004/0085905 | A1* | 5/2004 | Lim et al. | 370/236.2 |
| 2004/0100962 | A1* | 5/2004 | Kim et al. | 370/392 |
| 2004/0114592 | A1* | 6/2004 | Kang et al. | 370/389 |
| 2004/0156390 | A1* | 8/2004 | Prasad et al. | 370/466 |
| 2004/0228633 | A1* | 11/2004 | Kim et al. | 398/100 |
| 2005/0071517 | A1* | 3/2005 | O'Mahony | 710/1 |
| 2007/0014309 | A1* | 1/2007 | Lewin et al. | 370/466 |

FOREIGN PATENT DOCUMENTS

| JP | 2003-069642 | 3/2003 |
|---|---|---|
| JP | 2003-152753 | 5/2003 |
| JP | 2003-298643 | 10/2003 |

\* cited by examiner

*Primary Examiner*—Anh-Vu Ly
(74) *Attorney, Agent, or Firm*—Cha & Reiter, LLC (57) ABSTRACT

A broadcast/communication convergence system and method for transmitting and receiving Ethernet data by an optical network unit (ONU) performing a time division multiplexing (TDM) operation and switching by a network switch. A resultant signal is transmitted to a corresponding subscriber set-top box (SSTB), and data from the SSTB is provided to the network switch. A length of an Ethernet data frame is provided from the network switch, and an encapsulation generates and inserts data length information into an Ethernet data frame, for transmission to the SSTB. The SSTB carries out a TDM operation for a signal transmitted from the ONU, and separates the signal into Ethernet and broadcast data. A framing bit is detected based on a result of the separated signals, the length information is detected. A preamble bit and a start-of-field delimiter (SFD) are inserted into the recognized Ethernet data to recover the original Ethernet data.

8 Claims, 8 Drawing Sheets

METHOD FOR TRANSMITTING AND RECEIVING ETHERNET DATA IN SYSTEM BASED ON BROADCAST/COMMUNICATION CONVERGENCE

CLAIM OF PRIORITY

This application claims priority, pursuant to 35 U.S.C. §119, to that patent application entitled "METHOD FOR TRANSMITTING AND RECEIVING ETHERNET DATA IN SYSTEM BASED ON BROADCAST/COMMUNICATION CONVERGENCE," filed in the Korean Intellectual Property Office on Jan. 30, 2004 and assigned Serial No. 2004-6150, the contents of which are hereby incorporated by reference.

BACKGROUND OF THE INVENTION

1. Field of the Invention

The present invention relates to a system based on broadcast/communication convergence, and more particularly to a TDMA system including an optical network unit for multiplexing and transmitting broadcast data and Ethernet data and a subscriber set-top box for receiving and processing the multiplexed data.

2. Description of the Related Art

Conventionally, broadcast transmission is unidirectional transmission that is received by a number of unspecified receivers according to the characteristics of the broadcast. Service and network providers for the broadcast are typically identical. Communication, on the other hand, is bidirectional and is based on one-to-one transmission and reception operations according to the characteristics of the communication. In this case, service and network providers for the communication typically are not identical.

Furthermore, not only are the broadcast and communication service providers different, but the relay networks for the broadcast and communication transmission are also different. For this reason, the linkage of the broadcast and communication transmission has not been considered. However, as transmission networks are quickly developed and the boundary between broadcast and communication has become less distinct, interest in a system based on broadcast/communication convergence has increased.

In order for quality of service (QoS) of communication data to be ensured when the broadcast and communication transmission are converged, the communication data and broadcast data are time division multiplexed and the broadcast data is transmitted in the form of a multi-program transport stream (MPTS). In case of an Ethernet communication service, Ethernet data is transmitted in packets. Thus, a broadcast data transmission method and a communication data transmission method are different and must be accommodated in a system based on or providing broadcast/communication convergence.

In the case of a broadcast transmission, a seamlessly continuous signal must be provided. Thus, the broadcast data must be transmitted in packets wherein preceding and following packets can be linked to each other after the packetizing operation. It is thus necessary that a buffer and delay time are required for the packet processing operation. A processing operation based on the time division multiplexing is required wherein the broadcast data is provided by a seamlessly continuous signal in real time.

A communication network using conventional Ethernet equipment is a packet communication network, and is based on a local area network (LAN) or Internet communication network. A configuration of the Ethernet communication network used by subscribers typically uses a 10 Megabit/sec transmission (referred to as 10 Mbase-T). This is used in many LANs and is used in companies and schools. Recently, a 100-Mbps Internet communication service of 100 Mbase-T is being provided to subscriber homes using an unshielded twisted pair (UTP) cable referred to as a metro Ethernet communication network. Typically, an Ethernet signal is a signal based on a unit of a packet consisting of frames. In order for the Ethernet signal to be multiplexed into a continuous bit stream, an operation for processing various information units such as packet information is needed. For this reason, overhead (O/H) increases and an additional operation must be carried out.

Systems based on the broadcast/communication convergence using the Ethernet communication network and Ethernet equipment are being developed. In such system, a time division multiplexer (TDM) multiplexes a digital broadcast stream and Ethernet data, and a new form of a digital stream is generated and distributed to the subscribers.

Figure 1:
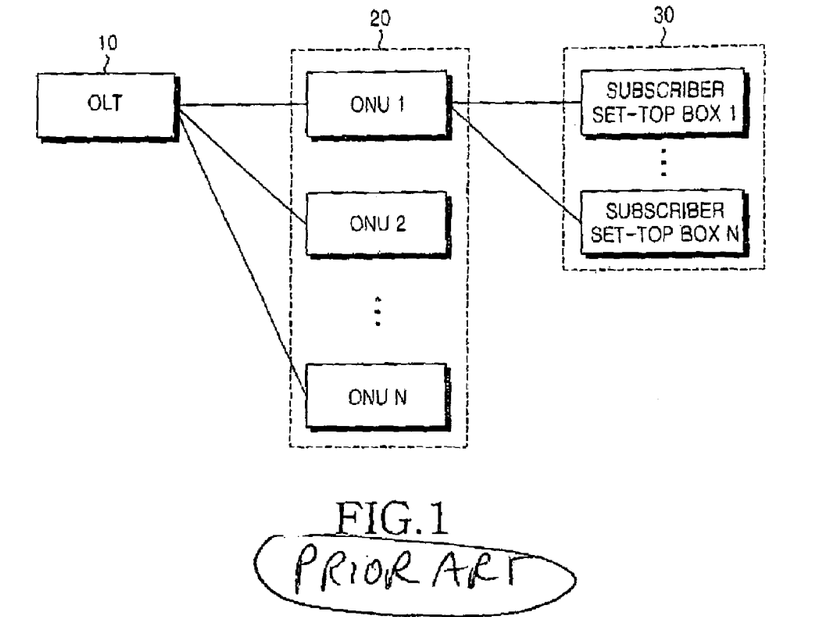
FIG. 1 is a block diagram illustrating the configuration of a typical system based on broadcast/communication convergence.

FIG. 1 illustrates a conventional system for providing a broadcast/communication convergence service. As shown, the system includes an optical line terminal (OLT) 10 for electro-optically converting broadcast data from a broadcast provider (not shown) and transferring the electro-optically converted broadcast data through an optical signal that can be transmitted and provided to subscribers, an optical network unit (ONU) 20 serving as a user side device for transferring information received from the OLT 10 to a subscriber set-top box 30, and an optical cable connected between the OLT 10 and the ONU 20. When the broadcast/communication data from a service provider (not shown) is transmitted to the ONU 20 through the OLT 10, the ONU 20 receives a service request from a terminal of a service user and carries out a time division multiplexing operation for the broadcast/communication data, such that a corresponding service is provided.

Figure 2:
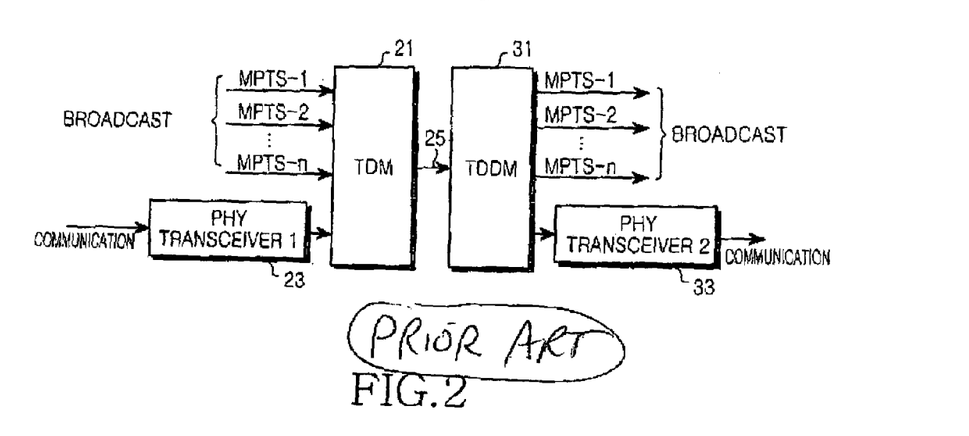
FIG. 2 is a block diagram illustrating an example of multiplexing and demultiplexing in the system based on broadcast/communication convergence performing a time division multiplexing operation.

FIG. 2 is a block diagram illustrating an example of a conventional time division multiplexing and demultiplexing operation in a broadcast/communication convergence system. As shown, the broadcast/communication convergence system multiplexes broadcast signals and a communication signal into a single signal according to known time division multiplexing methods, and then transmits the multiplexed single signal. For the system shown, the system converts the communication signal into a media independent interface (MII) signal that is equivalent to a broadcast stream by means of a physical layer (PHY) transceiver 23. The converted communication signal and the broadcast signals are applied to a time division multiplexer (TDM) 21 such that the TDM 21 carries out the time division multiplexing operation on the inputted signals and causes to be transmitted the single signal 25. The Ethernet MII signal is 4-bit parallel signal that are discontinuously received with packet lengths varying between a minimum of 64 bytes and a maximum of 1518 bytes.

At the receiving side, the received signal is provided to time division demultiplexer (TDDM) 31 so that the TDDM 31 carries out a time division demultiplexing operation. Broadcast streams, based on each broadcast channel, and the MII signal, i.e., the communication signal, are outputted as a result of the time division demultiplexing operation.

When the broadcast/communication convergence system transmits an optical signal to a customer, e.g., a consecutive digital broadcast or Video on Demand (VoD) signal, the transmission is unidirectionally, and any Ethernet communication signal is transmitted and received in a burst mode.

Thus, because the Ethernet packet length is variable, information of an Ethernet packet length is extracted and an idle signal is generated for a section in which Ethernet data is not present. Thus, a buffering operation is required to be carried out before the multiplexing operation is performed.

Figure 3:
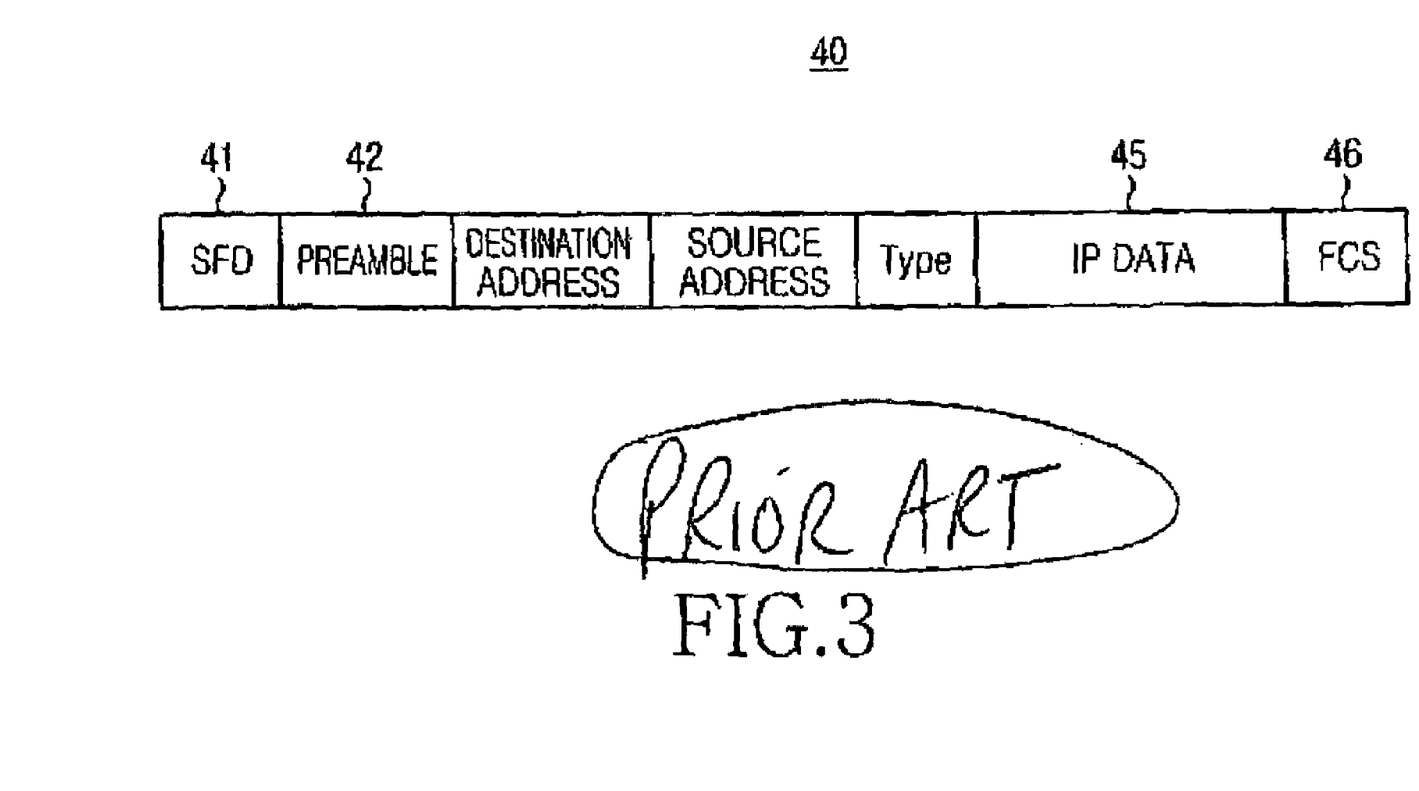
FIG. 3 shows a format of Ethernet data outputted from a physical layer (PHY) transceiver shown in FIG. 2.

Furthermore, when the ONU 20 multiplexes 5-bit Ethernet packet data and a broadcast digital stream and transmits the resultant multiplexed signal, the Ethernet data must be converted into, for example, 4-bit data (100M) based on a media access control (MAC) format having xMII through the PHY transceiver 23. For this, when reaching a MAC layer (data link layer) through a physical layer (PHY) of the seven layer Open Systems Interconnection (OSI) model, the Ethernet data encoded into 5-bit data (125M) must be converted into 4-bit data (100M). Here, the 5-bit data includes control codes indicating a start and end of the data packet or is converted into the 4-bit data so that true Ethernet data can be generated. When a packet with the true Ethernet data is transmitted, the data link layer cannot recognize the start and end of a packet as long as Internet protocol (IP) information of a data field in a frame format, as shown in FIG. 3, is not analyzed.

A digital logic device such as a field programmable gate array (FPGA) can further be provided downstream of the PHY transceiver so that a 4-bit code can be encoded into a 5-bit code. In this case, the 5-bit code in the FPGA can use 16 control codes, but the bandwidth is increased by 25%. When an Ethernet time division multiplexing operation for the 5-bit code is carried out, the bandwidth required is excessively increased. Hence, the 5-bit code is not appropriate for a relatively slow logic device such as the FPGA.

Hence, when the time division multiplexing operation for 4-bit MAC data and a digital stream is desired to be carried out, a need exists for an additional device capable of analyzing IP information in the data link layer and analyzing packet length information.

SUMMARY OF THE INVENTION

An object of the present invention is to provide a broadcast/communication convergence system and a method for transmitting and receiving Ethernet data that can process Ethernet data received at a subscriber set-top box in a physical layer without requiring a process for encoding the Ethernet data into 5-bit data when an optical network unit of the broadcast/communication convergence system carries out a time division multiplexing operation for 4-bit Ethernet data and broadcast data.

In accordance with one aspect of the present invention the above and other objectives can be accomplished by the provisions of a method for transmitting and receiving Ethernet data in a system based on broadcast/communication convergence, wherein the system is equipped with an optical network unit for carrying out a time division multiplexing operation for the Ethernet data switched by a network switch and a plurality of broadcast data units, transmitting a result of the time division multiplexing operation to a corresponding subscriber set-top box, and providing data from the subscriber set-top box to the network switch, the method comprising the steps of (a) producing a length of an Ethernet data frame provided from the network switch, (b) carrying out an encapsulation operation by generating data length information and inserting the generated length information into the Ethernet data frame, (c) transmitting encapsulated Ethernet data to the subscriber set-top box, (d) allowing the subscriber set-top box to carry out a time division demultiplexing operation for a signal transmitted from the optical network unit and separate the signal into the Ethernet data and broadcast data, (e) detecting a framing bit from the frame of the Ethernet data based on a result of the separation, detecting the length information from the Ethernet data frame, (f) counting the Ethernet data frame on the basis of the detected length information and recognizing the Ethernet data; and (g) inserting a preamble bit and a start-of-field delimiter (SFD) into the recognized Ethernet data and recovering and processing original Ethernet data.

In accordance with another aspect of the present invention, the above and other objects can be accomplished by the provisions of a system based on broadcast/communication convergence, the system comprising an optical transmitter for transmitting Ethernet data and broadcast data from a server computer through an optical signal, an optical network unit for producing a length of the Ethernet data based on a media independent interface (MII) format provided from a network switch switching the Ethernet data from the optical transmitter, carrying out an encapsulation operation by inserting length information into an Ethernet data frame, and carrying out a time division multiplexing operation on a result of the encapsulation operation and the broadcast data, and a set-top box for carrying out a time division demultiplexing operation for data transmitted from the optical network unit, separating the transmitted data into the Ethernet data and the broadcast data, extracting the length information from the Ethernet data frame according to a result of the separation, and recognizing and processing the Ethernet data on the basis of the extracted length information.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Embodiments of the present invention will be described in detail with reference to the accompanying drawings. In the drawings, the same or similar elements are denoted by the same reference numerals even though they are depicted in different drawings. In the following description made in conjunction with embodiments of the present invention illustrated, a variety of specific elements are shown. The description of such elements has been made only for a better understanding of the present invention. Those skilled in the art will appreciate that the present invention can be implemented without using the above-mentioned specific elements. Further, for the purpose of clarity, in the following description, a detailed description of known functions and configurations incorporated herein will be omitted when it may make the subject matter of the present invention unclear.

Figure 4:
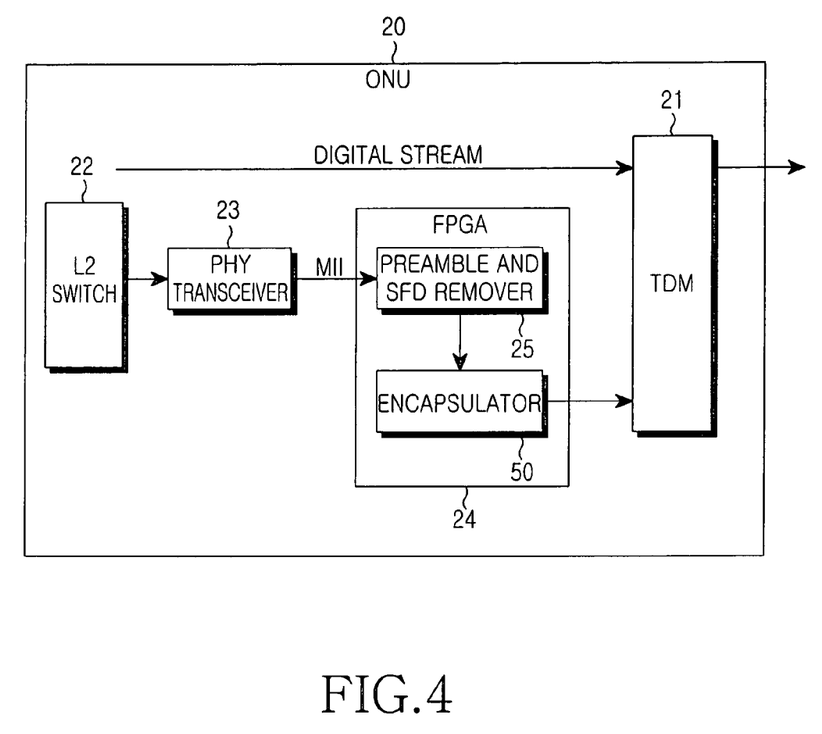
FIG. 4 is a block diagram illustrating the internal configuration of an optical network unit (ONU) in accordance with the present invention.
Figure 5:
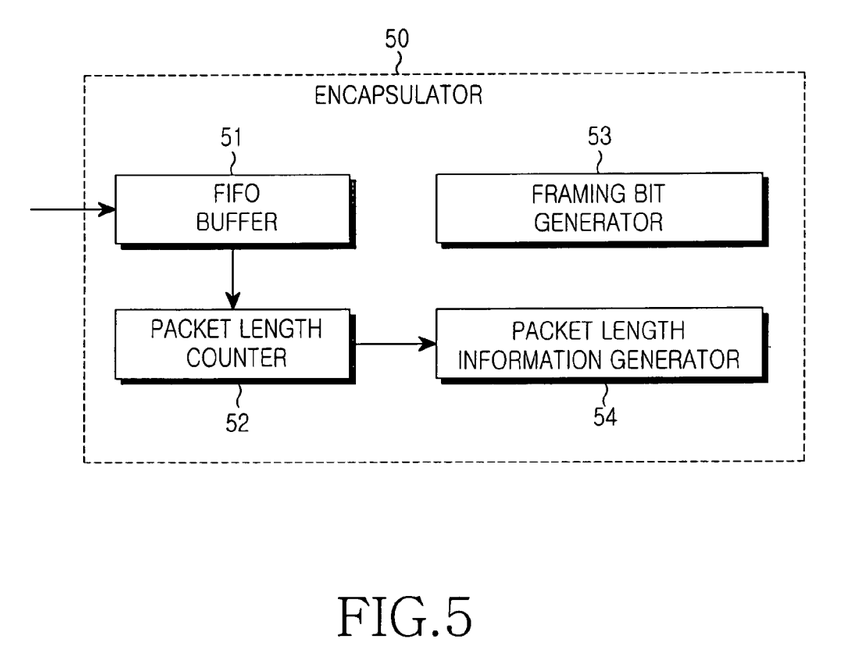
FIG. 5 is a block diagram illustrating the internal configuration of an encapsulator shown in FIG. 4.

FIG. 4 is a block diagram illustrating an internal configuration of the ONU 20 in accordance with the present invention and FIG. 5 is a block diagram illustrating the internal configuration of encapsulator 50 shown in FIG. 4.

Referring to FIG. 4, ONU 20 includes an L2 switch 22, a physical layer (PHY) transceiver 23 coupled to L2 switch 22 for converting serial Ethernet data of 5 bits into a 4-bit signal based on a media independent interface (MII) format, a field programmable gate array (FPGA) 24 serving as a frame regenerator for receiving Ethernet data based on the MII format provided from the PHY transceiver 23, and a time division multiplexer (TDM) 21 for carrying out a time division multiplexing operation for the Ethernet data outputted from the FPGA 24 and broadcast digital stream(s).

In accordance with the present invention, FPGA 24 performs an encapsulation operation by inserting data length information into the Ethernet frame to generate a new format of an Ethernet frame. The FPGA 24 stores a program for converting the Ethernet data provided from the PHY transceiver 23 into Ethernet data processable in a physical layer of the well-known OSI model.

FPGA 24 includes a preamble and start-of-field delimiter (SFD) remover 25 for removing a preamble and an SFD from the Ethernet data outputted by the PHY transceiver 23 and an encapsulator 50 for carrying out an encapsulation operation by inserting a framing bit and length information into the Ethernet data to generate new frame data, as will be described with regard to FIG. 7.

FIG. 5 is a block diagram illustrating in more detail the encapsulator 50 shown in FIG. 4. Encapsulator 50 includes a first-in first-out (FIFO) buffer 51 for buffering Ethernet data provided from the preamble and SFD remover 25, a packet length information generator 54 for enabling a packet length counter 52 to count true Ethernet data and generate length information, and a framing bit generator 53 for generating a framing bit. In one aspect, the framing bit indicates a start of a frame.

Figure 6:
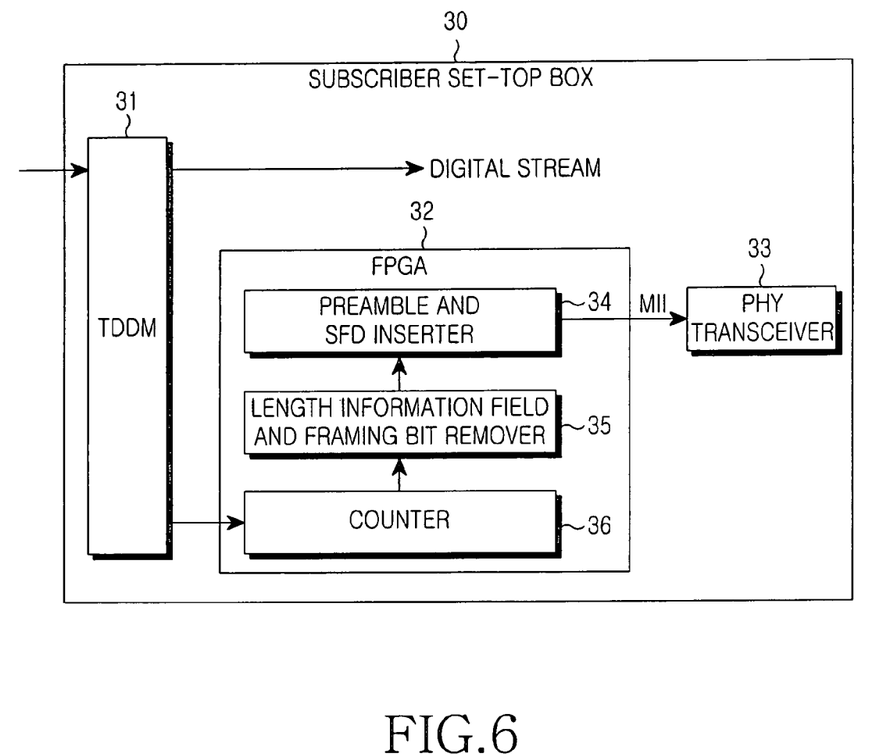
FIG. 6 is a block diagram illustrating the internal configuration of a subscriber set-top box in accordance with the present invention.

FIG. 6 is a block diagram illustrating an internal configuration of the subscriber set-top box 30 in accordance with the present invention. As shown, the subscriber set-top box 30 includes a time division demultiplexer (TDDM) 31 for carrying out a time division demultiplexing operation on data transmitted from the ONU 20, a field programmable gate array (FPGA) 32 serving as a frame recovery device for receiving demultiplexed Ethernet data, and a physical layer (PHY) transceiver 33 for receiving demultiplexed Ethernet data based on a media independent interface (MII) format.

In this case, FPGA 32, serving as the frame recovery device, includes a counter 36 for counting the Ethernet data outputted from the TDDM 31, a functional block 35 for detecting a framing bit and removing the framing bit and a length information field, and a functional block 34 for inserting a preamble and a start-of-field delimiter (SFD) into the Ethernet data to recover original Ethernet data. The Ethernet data recovered by the preamble and SFD inserter 34 is provided to a network card of a user computer (not shown) through the PHY transceiver 33.

Referring to FIG. 3, a format of Ethernet data outputted from the L2 switch 22 is shown. This format includes a start-of-field delimiter (SFD) 41, a preamble 42 for clocking and synchronization, a destination address field into which a media access control (MAC) address of a destination device to receive a packet is inserted, a source address field into which a MAC address of a transmitting side's device is inserted, a type field, an Internet protocol (IP) data field 45, and a frame check sum (FCS) field 46.

Figure 7:
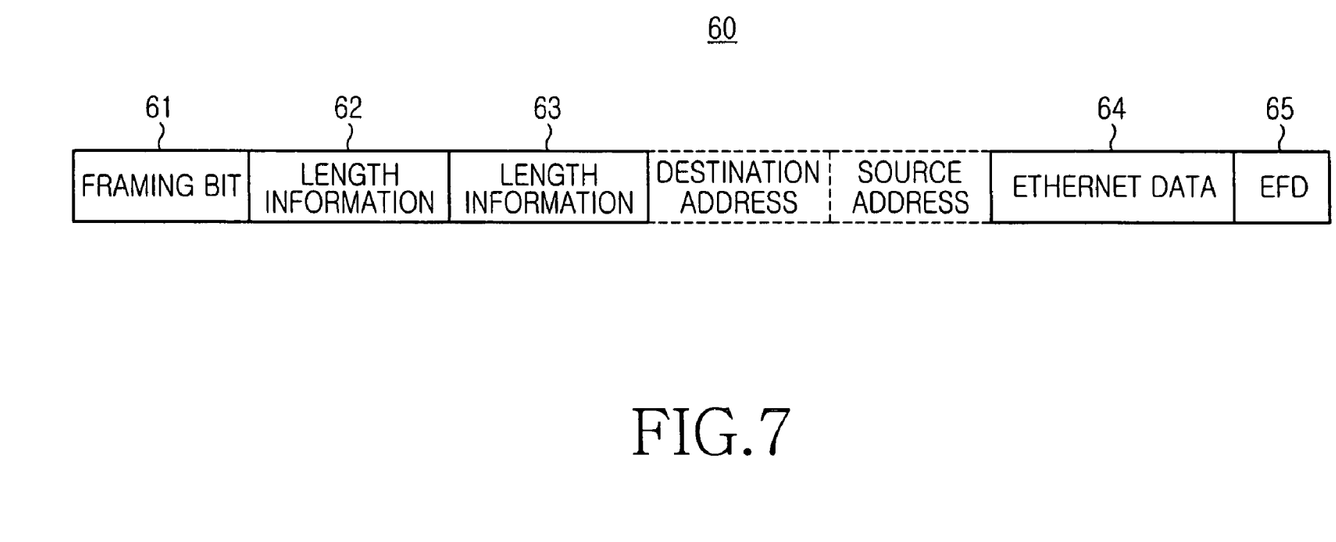
FIG. 7 shows a format of encapsulated Ethernet data in accordance with the present invention.

FIG. 7 shows the format of an encapsulated Ethernet data frame in accordance with the present invention. As shown, Ethernet data frame 60 includes a framing bit 61, two length-information fields 62 and 63, Ethernet data 54 and an end-of-frame delimiter (EFD) field 65.

In accordance with the principles of the invention, the framing bit 61 is used for allowing the receiving side to determine whether received data is Ethernet data. Two length information fields 62 and 63 are provided to correctly discriminate the framing bit and length information when the framing bit is the same as a code. The use of length information fields 62 and 63 is advantageous as indicating the length of Ethernet data allows the Ethernet data to be processed in a physical layer of the OSI model and a processing operation in a data link layer can be omitted.

Figure 8:
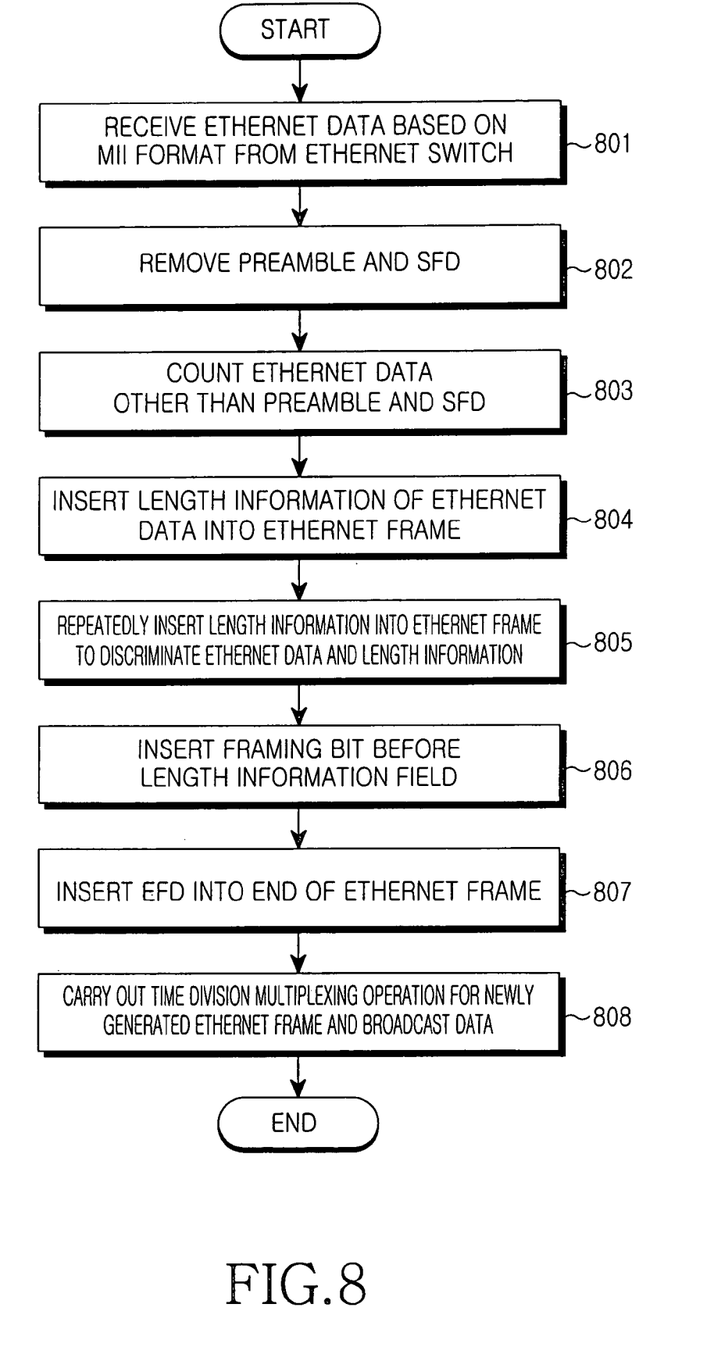
FIG. 8 is a flowchart illustrating a method for carrying out an encapsulation operation in the ONU in accordance with the present invention.

FIG. 8 is a flowchart illustrating a method for carrying out an encapsulation operation in the ONU 20 in accordance with the present invention. The FPGA 24 serving as the frame regenerator in accordance with the present invention receives the Ethernet frame 60 based on the MII format switched by the L2 switch at step 801. The FPGA 24 removes a preamble and an SFD from the Ethernet frame at step 802. The encapsulator 50 of the FPGA 24 counts the Ethernet data, other than the preamble and the SFD, using the counter at step 803. The encapsulator 50 of the FPGA 24 inserts 11-bit length information indicating the maximum length of Ethernet data into the Ethernet frame at step 804. The encapsulator 50 of the FPGA 24 repeatedly inserts the length information necessary for discriminating the Ethernet data and the length information into the Ethernet frame at step 805. This is for the case when the Ethernet data is the same as the length information. A framing bit is inserted before the length information field and an encapsulation operation is completed at step 806. The encapsulator 50 inserts a 4-bit EFD into an end of a newly generated Ethernet frame at step 807. The TDM 21 carries out a time division multiplexing operation for the Ethernet frame generated by the encapsulator 50 and broadcast data and transmits the resultant signal to the subscriber set-top box 30 through an optical transmitter (not shown) at step 808.

Figure 9:
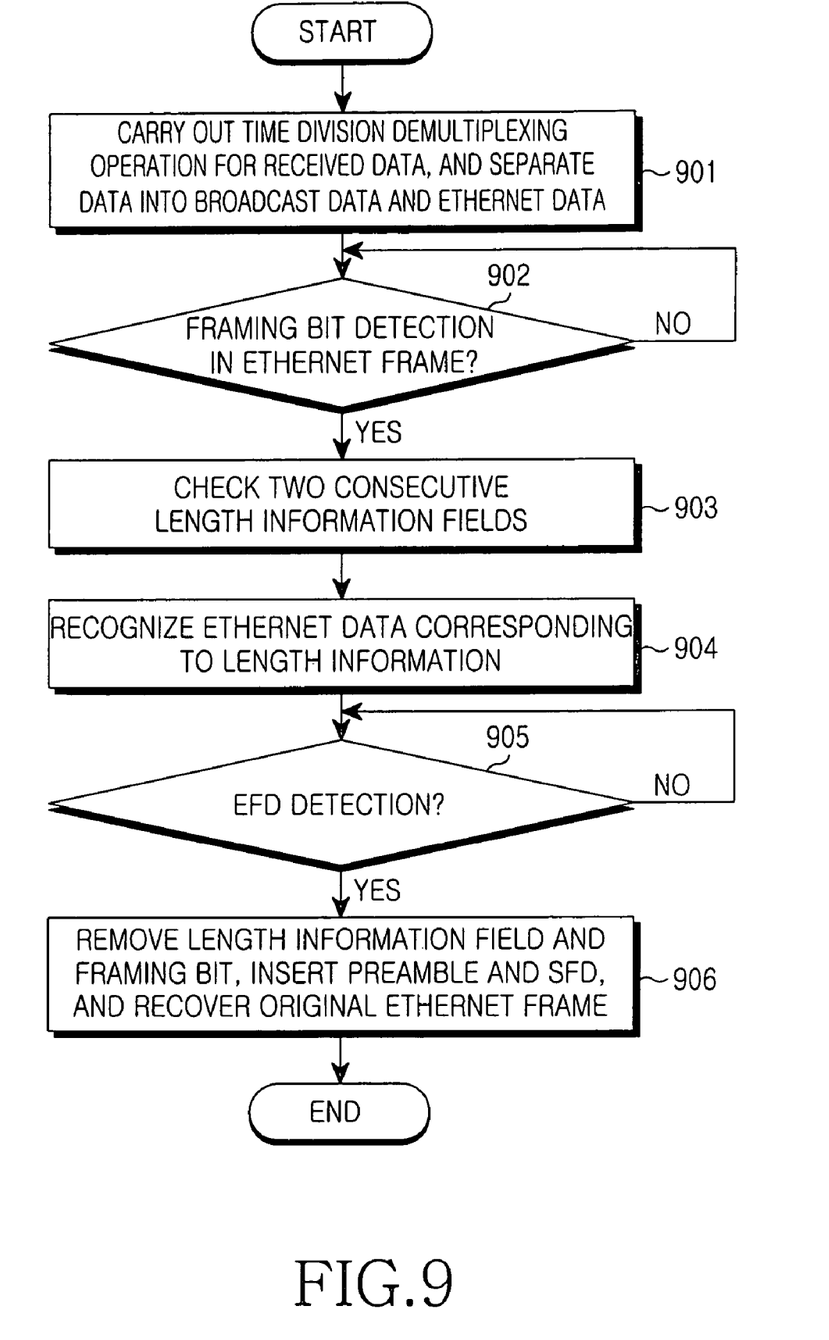
FIG. 9 is a flowchart illustrating a method for recovering an Ethernet data frame in the subscriber set-top box in accordance with the present invention.

FIG. 9 is a flowchart illustrating a method for recovering an Ethernet frame in the subscriber set-top box 30 in accordance with the present invention. The subscriber set-top box 30 receives data from the ONU 20, enables the TDDM 31 to carry out a time division demultiplexing operation for the received data so that the received data can be separated into broadcast data and Ethernet data at step 901. The FPGA 32, (see FIG. 6) detects a framing bit from the Ethernet data at step 902. When the framing bit is detected, the FPGA 32 checks two consecutive length information bits in the Ethernet frame at step 903. Then, the FPGA 32 enables the counter to count a data field, and recognizes Ethernet data corresponding to the checked length information at step 904. When an EFD is detected from the Ethernet frame at step 905, the length information field and framing bit remover 35 removes the length information bits and the framing bit, and the preamble and SFD inserter 34 inserts an Ethernet preamble and an SFD into the Ethernet data, such that original Ethernet data is recovered and processed at step 906.

Although the embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims which follow, along with their full scope of equivalents.

What is claimed is:

1. A method for transmitting and receiving Ethernet data in a broadcast/communication convergence system, the system being equipped with an optical network unit for carrying out a time division multiplexing operation for the Ethernet data switched by a network switch and a plurality of broadcast data units, transmitting a result of the time division multiplexing operation to a corresponding subscriber set-top box, and providing data from the subscriber set-top box to the network switch, the method comprising the steps of:

(a) producing a length of an Ethernet data frame provided from the network switch at the optical network unit;
    (b) removing the a preamble bit and a Start-of-field Delimiter (SFD) from the Ethernet data frame, and performing an encapsulation operation, wherein a data length information is determined and inserted into the Ethernet data frame;
    (c) transmitting the encapsulated Ethernet data frame to the subscriber set-top box;
    (d) performing a time division demultiplexing operation at the subscriber set-top box for a Ethernet data frame transmitted from the optical network unit and separate the Ethernet data frame into the Ethernet data and broadcast data;
    (e) detecting a framing bit from the frame of the Ethernet data based on a result of the separation, detecting the length information from the Ethernet data frame;
    (f) counting the Ethernet data frame on the basis of the detected length information and recognizing the Ethernet data; and
    (g) inserting a preamble bit and a start-of-field (SFD) into the recognized Ethernet data and recovering and processing original Ethernet data.

2. The method as set forth in claim 1, wherein the step performing an encapsulation operation further comprises the step of:

inserting the framing bit and an end-of-field delimiter (EFD) in the Ethernet data frame.

3. The method as set forth in claim 1, wherein the step performing an encapsulation operation further comprises the step of:

repeatedly inserting the length information into the Ethernet data frame.

4. The method as set forth in claim 1, wherein the step inserting a preamble bit and a start-of-field delimiter (SFD) further comprises the step of:

removing the framing bit and the length information from the Ethernet data frame after recognizing the Ethernet data.

5. A broadcast/communication convergence system, comprising:

an optical transmitter for transmitting Ethernet data and broadcast data;
    an optical network unit including:
    a frame regenerator for producing a length of an Ethernet data frame provided from a network switch and performing an encapsulation operation by inserting length information into the Ethernet data frame; and
    a time division multiplexer (TDM) for performing a time division multiplexing operation for the encapsulated Ethernet data frame provided from the frame regenerator, together with broadcast data;
    a set-top box including:
    means for performing a time division demultiplexing operation for an Ethernet data frame transmitted from the optical network unit;
    means for separating the transmitted Ethernet data frame into the Ethernet data and the broadcast data, extracting the length information from the Ethernet data frame according to a result of the separation; and
    means for recognizing and processing the Ethernet data no the basis of the extracted length information,
    wherein the frame regenerator includes a field remover for removing fields of a preamble and a start-of-field delimiter (SFD) from the Ethernet data frame, and an encapsulator for counting a data length of the Ethernet data frame, generating the length information, and inserting the generated length information into the Ethernet data frame.

6. The system as set forth in claim 5 wherein the encapsulator comprises:

a buffer for buffering the Ethernet data from which the preamble is removed;
    a counter for counting the data length of the Ethernet data frame;
    a length information generator for generating the length information based on a count value of the counter; and
    a framing bit generator for generating a framing bit necessary for discriminating a start of the Ethernet data frame, and inserting the generated framing bit and an end-of-field delimiter (EFD) into the Ethernet data from which the preamble is removed.

7. The system as set forth in claim 5, wherein the encapsulator repeatedly inserts the length information into the Ethernet data frame.

8. The system as set forth in claim 5, wherein the subscriber set-top box comprises:

a digital logic device comprising:
    a counter;
    a length information remover for counting the Ethernet data frame outputted from a time division demultiplexer (TDDM) by means of the counter, and removing a length information field, a framing bit and an end-of-field delimiter (EFD); and
    a preamble inserter for inserting a preamble and a start-of-field delimiter (SFD) into the Ethernet data frame from which the length information field is removed.

* * * * *